United States Patent
Devlin et al.

(10) Patent No.: US 12,518,221 B2
(45) Date of Patent: *Jan. 6, 2026

(54) BEHAVIOR POLICY FOR A GENERALIZED REINFORCEMENT LEARNING AGENT UTILIZING A WEIGHT OF A LOSS FUNCTION

(71) Applicant: Microsoft Technology Licensing, LLC, Redmond, WA (US)

(72) Inventors: Sam Michael Devlin, Trumpington (GB); Maximilian Igl, London (GB); Kamil Andrzej Ciosek, Cambridge (GB); Yingzhen Li, Cambridge (GB); Sebastian Tschiatschek, Cambridge (GB); Cheng Zhang, Cambridge (GB); Katja Hofmann, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 303 days.

This patent is subject to a terminal disclaimer.

(21) Appl. No.: 18/052,202

(22) Filed: Nov. 2, 2022

(65) Prior Publication Data
US 2023/0111659 A1 Apr. 13, 2023

Related U.S. Application Data

(63) Continuation of application No. 16/590,353, filed on Oct. 1, 2019, now Pat. No. 11,526,812.

(51) Int. Cl.
*G06N 20/00* (2019.01)
*G06N 20/20* (2019.01)

(52) U.S. Cl.
CPC .................................. *G06N 20/20* (2019.01)

(58) Field of Classification Search
None
See application file for complete search history.

(56) References Cited

U.S. PATENT DOCUMENTS

| | | | | |
|---|---|---|---|---|
| 10,733,502 | B2 * | 8/2020 | Nachum | G06N 3/006 |
| 11,132,609 | B2 * | 9/2021 | Pascanu | G06N 3/084 |
| 11,844,100 | B2 * | 12/2023 | Ayala Romero | G06N 3/045 |
| 2009/0099985 | A1 * | 4/2009 | Tesauro | G06N 5/02 706/12 |
| 2017/0032245 | A1 * | 2/2017 | Osband | G06N 3/045 |
| 2018/0336479 | A1 * | 11/2018 | Guttmann | G06V 10/764 |
| 2021/0089869 | A1 * | 3/2021 | Baughman | G10L 15/16 |
| 2021/0205988 | A1 * | 7/2021 | James | B25J 9/163 |

* cited by examiner

*Primary Examiner* — Pakee Fang
(74) *Attorney, Agent, or Firm* — Barta Jones, PLLC (57) ABSTRACT

An apparatus has a memory storing a reinforcement learning policy with an optimization component and a data collection component. The apparatus has a regularization component which applies regularization selectively between the optimization component of the reinforcement learning policy and the data collection component of the reinforcement learning policy. A processor carries out a reinforcement learning process by: triggering execution of an agent according to the policy and with respect to a first task; observing values of variables comprising: an observation space of the agent, an action of the agent; and updating the policy using reinforcement learning according to the observed values and taking into account the regularization.

20 Claims, 11 Drawing Sheets

BEHAVIOR POLICY FOR A GENERALIZED REINFORCEMENT LEARNING AGENT UTILIZING A WEIGHT OF A LOSS FUNCTION

CROSS-REFERENCE TO RELATED APPLICATION

This application is a continuation application of and claims priority to U.S. patent application Ser. No. 16/590,353, entitled "GENERALIZED REINFORCEMENT LEARNING AGENT," filed on Oct. 1, 2019, the disclosure of which is incorporated herein by reference in its entirety.

BACKGROUND

Agents are physical or digital entities which behave in their environment according to a behavior policy. A non-exhaustive list of examples of agents is: a robotic vacuum cleaner, a robot arm in a robotic assembly line of a manufacturing plant, an avatar in a video game, a digital assistant (chat bot).

Typically values of parameters of the behavior policy are computed during a reinforcement learning process for a particular task. As a result it is difficult to use the agent for other tasks.

The embodiments described below are not limited to implementations which solve any or all of the disadvantages of known ways of training the behavior of an agent.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An apparatus has a memory storing a reinforcement learning policy with an optimization component and a data collection component. The apparatus has a regularization component which applies regularization selectively between the optimization component of the reinforcement learning policy and the data collection component of the reinforcement learning policy. A processor carries out a reinforcement learning process by: triggering execution of an agent according to the policy and with respect to a first task; observing values of variables comprising: an observation space of the agent, an action of the agent; and updating the policy using reinforcement learning according to the observed values and taking into account the regularization.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Typically an agent is trained using reinforcement learning to perform well on a particular task and this can lead to overfitting. As a result it is difficult to use the trained agent to carry out different tasks. The ability of an agent to generalize its ability to tasks which are different from the one it was trained on is referred to as the agent's generalization ability. Being able to generalize is a key requirement for the broad application of autonomous agents.

The present technology recognizes that regularization is a possible way of mitigating against overfitting but that regularization leads to potential problems in the case of reinforcement learning. Regularization comprises functionality to limit the information storing capacity of a machine learning model. There are many types of regularization functionality as described in more detail below. The inventors have recognized that applying regularization to a reinforcement learning process in a holistic manner leads to inaccuracies and problems in the resulting trained agent. In various embodiments regularization is applied selectively between an optimization component and a data collection component of a reinforcement learning policy. Using a selective approach whereby different amounts of regularization are applied to the optimization component and the data collection component is found empirically to give improved performance of a resulting trained agent, where performance is assessed in terms of return of accumulated sum of discount rewards and generalization ability.

Figure 1:
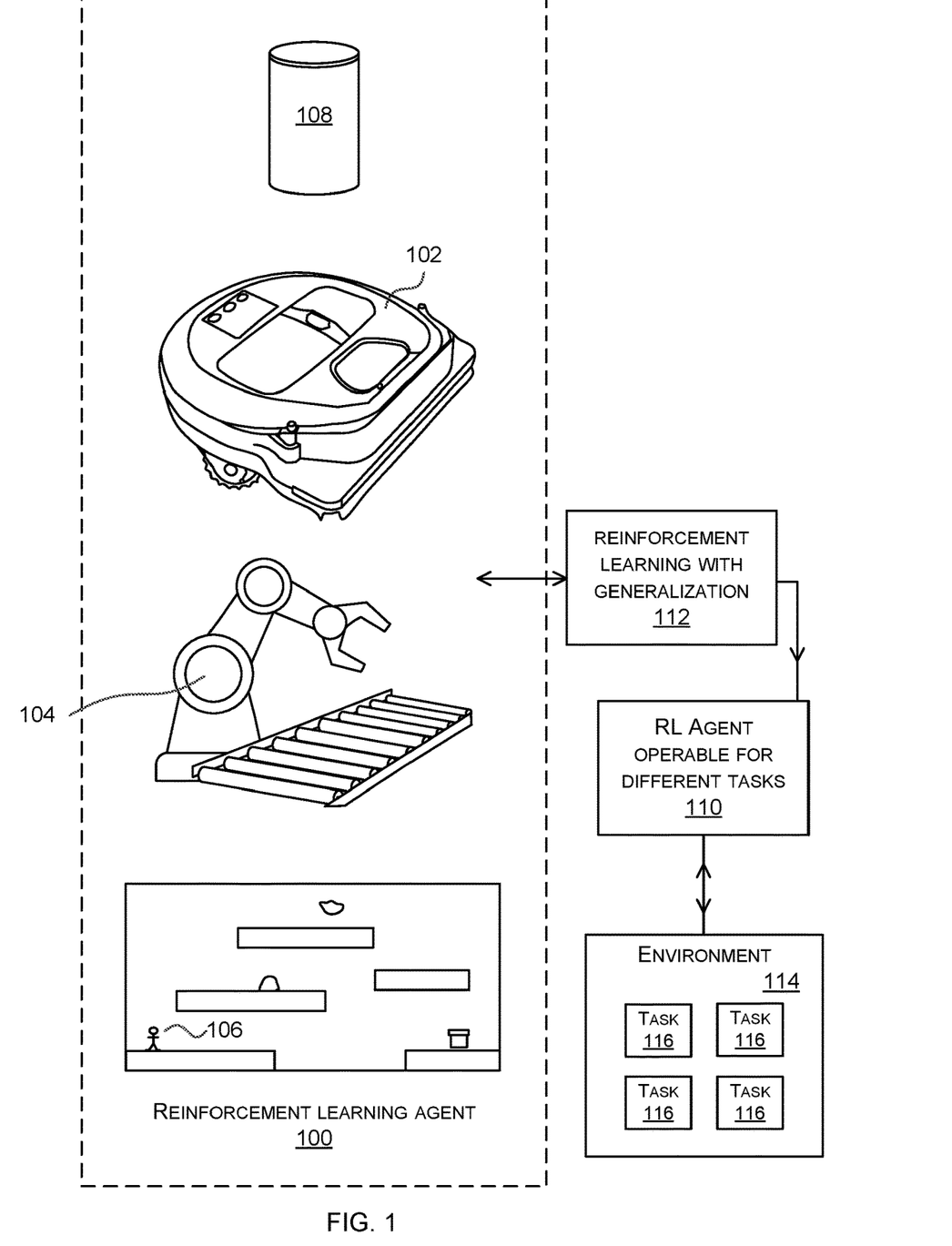
FIG. 1 is a schematic diagram of agents to be trained using reinforcement learning with generalization in order that they are operable for a plurality of different tasks.

FIG. 1 is a schematic diagram of agents 102, 104, 106, 108 to be trained using reinforcement learning with generalization 112 in order that they are operable 110 for a plurality of different tasks 116. In this example the agent is a robot vacuum cleaner 102 in a domestic home, or a robot arm 104 in a manufacturing plant, an avatar 106 in a video game, or a chat bot 108. The plurality of tasks 116 are a distribution of tasks 116 in an environment 114. Each task comprises a goal and a plurality of possible actions. Previously it has been difficult to train an agent using reinforcement learning with respect to a first task, and then have the agent work well for one or more different tasks. In the present technology reinforcement learning with generalization 112 is used to prevent overfitting and produce trained agents 110 which are operable on a plurality of different tasks. The generalization is applied selectively between an optimization component and a data collection component of a reinforcement learning policy.

The present technology uses reinforcement learning in order to enable agents to be trained to behave with respect to particular tasks according to a behavior policy. A behavior policy is a definition of how an agent behaves on a task and it is defined as a function which takes as arguments values of observation space variables and which computes values of action variables. The observation space is the part of the task that the agent has information about at a current time. The present technology uses any well-known reinforcement learning process to update the behavior policy according to tuples of values, where the tuples of values are values of the observation space variables for the current time, values of action variables for actions taken by the agent at the current time, and optionally values of any rewards which are applicable. The reinforcement learning process is augmented with selective regularization as described in more detail below.

The reinforcement learning with generalization 112 occurs in the cloud, or in the agent or is distributed between the cloud and the agent.

Alternatively, or in addition, the functionality of the agent or the reinforcement learning with generalization 112 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2A:
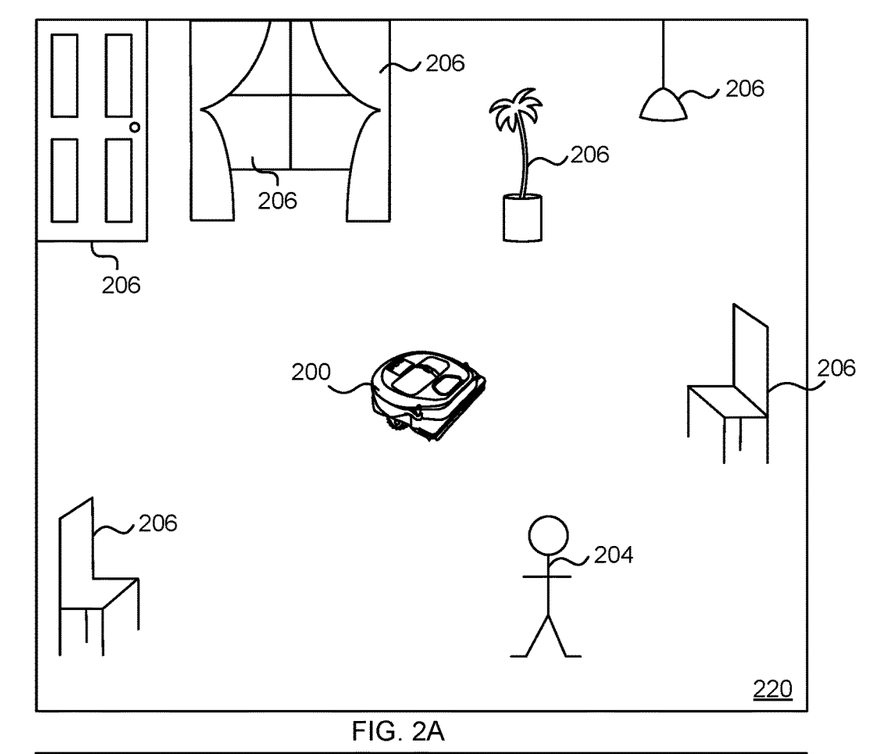
FIG. 2A is a schematic diagram of a robot vacuum cleaner in a living room.
Figure 2B:
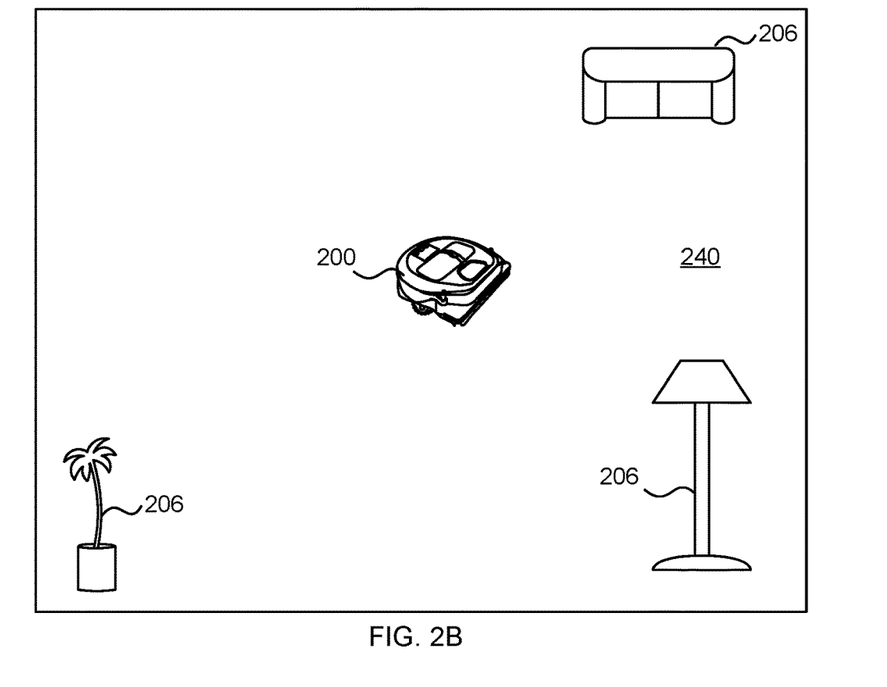
FIG. 2B is a schematic diagram of the robot vacuum cleaner of FIG. 2A in a different living room.

In the example of FIG. 2A the agent is a robot vacuum cleaner 200 in a domestic living room 220 where there are various objects 206. The robot vacuum cleaner 200 is trained using reinforcement learning with generalization, as described herein, to avoid bumping into the furniture and other objects including person 204 in the room 220. When the robot vacuum cleaner 200 has been trained it is moved into another room 240 as indicated in FIG. 2B. Because the robot vacuum cleaner 200 has been trained using reinforcement learning with generalization it is able to operate well in the second room 240, even though the furniture 206 is different and located in different positions than in the first room 220.

Figure 3A:
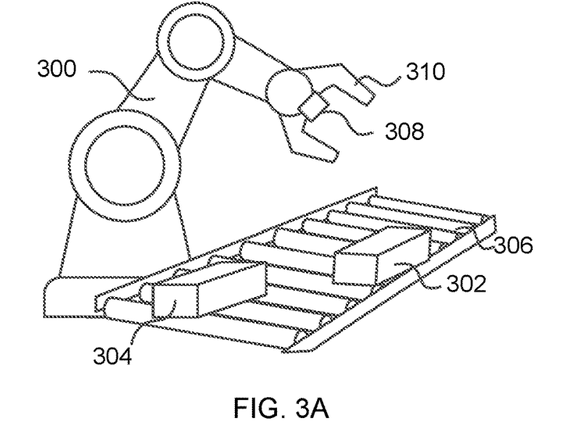
FIG. 3A is a schematic diagram of a robot arm in a manufacturing with boxes on a conveyor belt.

In the example of FIG. 3A the agent is a robot arm 300 in a manufacturing plant. A conveyor belt 306 conveys boxes 302, 304 to be picked up by the robot arm 300 using pincers 310. The boxes 302, 304 are in a variety of different positions on the conveyor belt and the robot arm has to detect the boxes using camera 308 in order to pick them up. The robot arm is trained using reinforcement learning (with generalization as described herein) to pick up the boxes 302, 304 without damaging the boxes 302, 304.

Figure 3B:
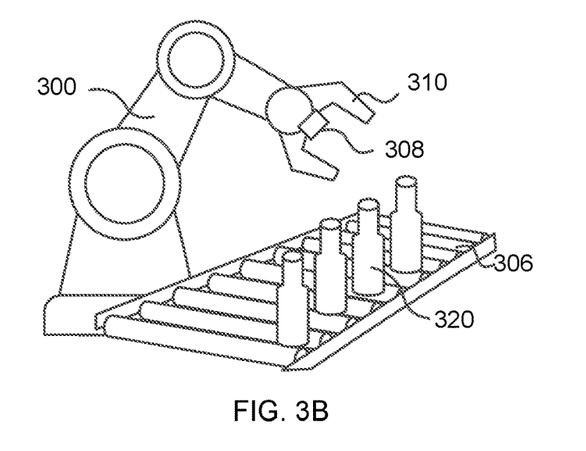
FIG. 3B is a schematic diagram of the robot arm of FIG. 3A in a manufacturing plant with bottles on a conveyor belt.

In the example of FIG. 3B the robot arm 300 of FIG. 3A is now faced with a new task whereby it has to pick up bottles 320 rather than boxes from the conveyor belt 306. Because the robot art has been trained using reinforcement learning with generalization it is able to perform the new task without needing to be re-trained.

Figure 3C:
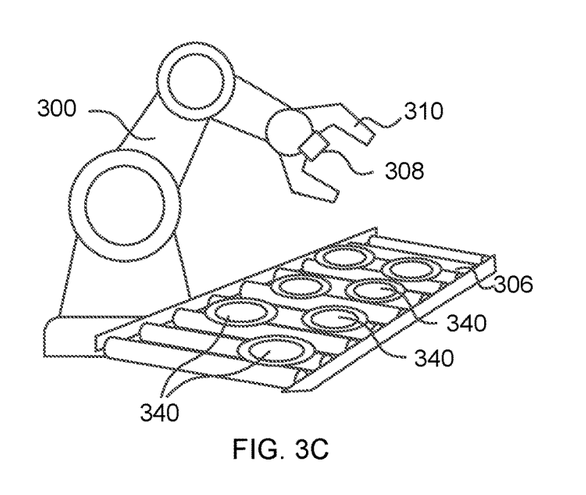
FIG. 3C is a schematic diagram of the robot arm of FIG. 3A in a manufacturing plant with plates on a conveyor belt.

In the example of FIG. 3C the robot art 300 of FIG. 3A is now faced with a new task whereby it has to pick up plates 340 rather than boxes from the conveyor belt 306. Because the robot art has been trained using reinforcement learning with generalization it is able to perform the new task without needing to be re-trained In the example of FIG. 4A the agent is an avatar 400 in a 2D platformer game. The task of the avatar 400 is to reach the doorway 404 by jumping over gap 402. The avatar 400 is trained using reinforcement learning with generalization as described herein in order to perform the task.

Figure 4A:
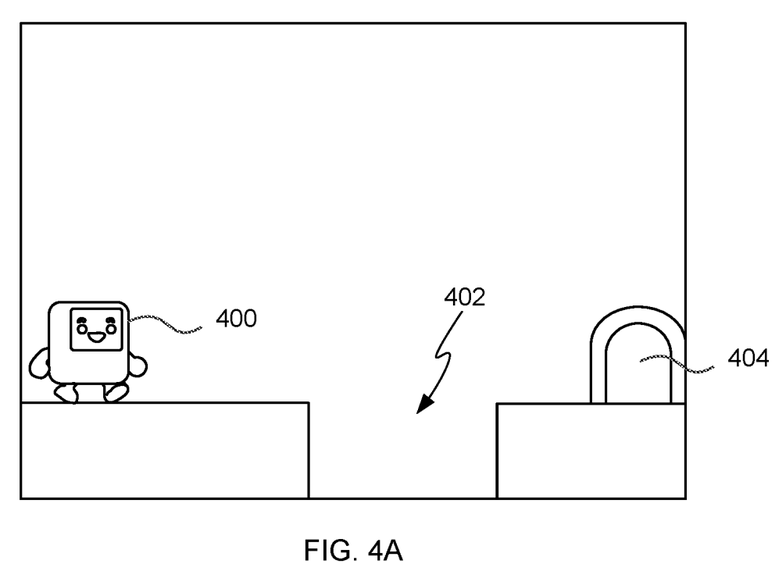
FIG. 4A is a schematic diagram of an avatar in a platformer game faced with a first task.
Figure 4B:
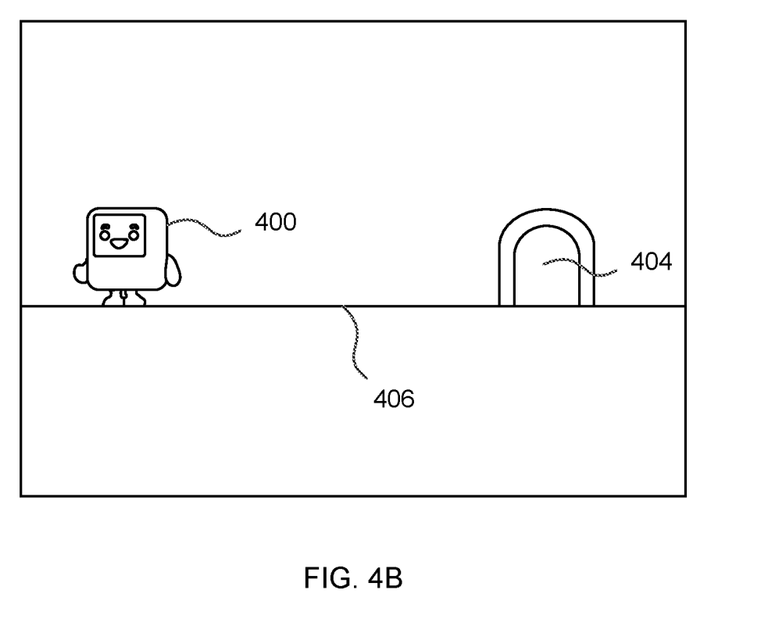
FIG. 4B is a schematic diagram of the avatar of FIG. 4A in a different task within the same platformer game environment.

In the example of FIG. 4B the avatar 400, which is the same avatar as from FIG. 4A, is given a new task which is to reach doorway 404 by moving along a surface 406. Because avatar 400 has been trained using reinforcement learning with generalization as described herein it is able to perform the new task without needing to be re-trained.

Figure 5:
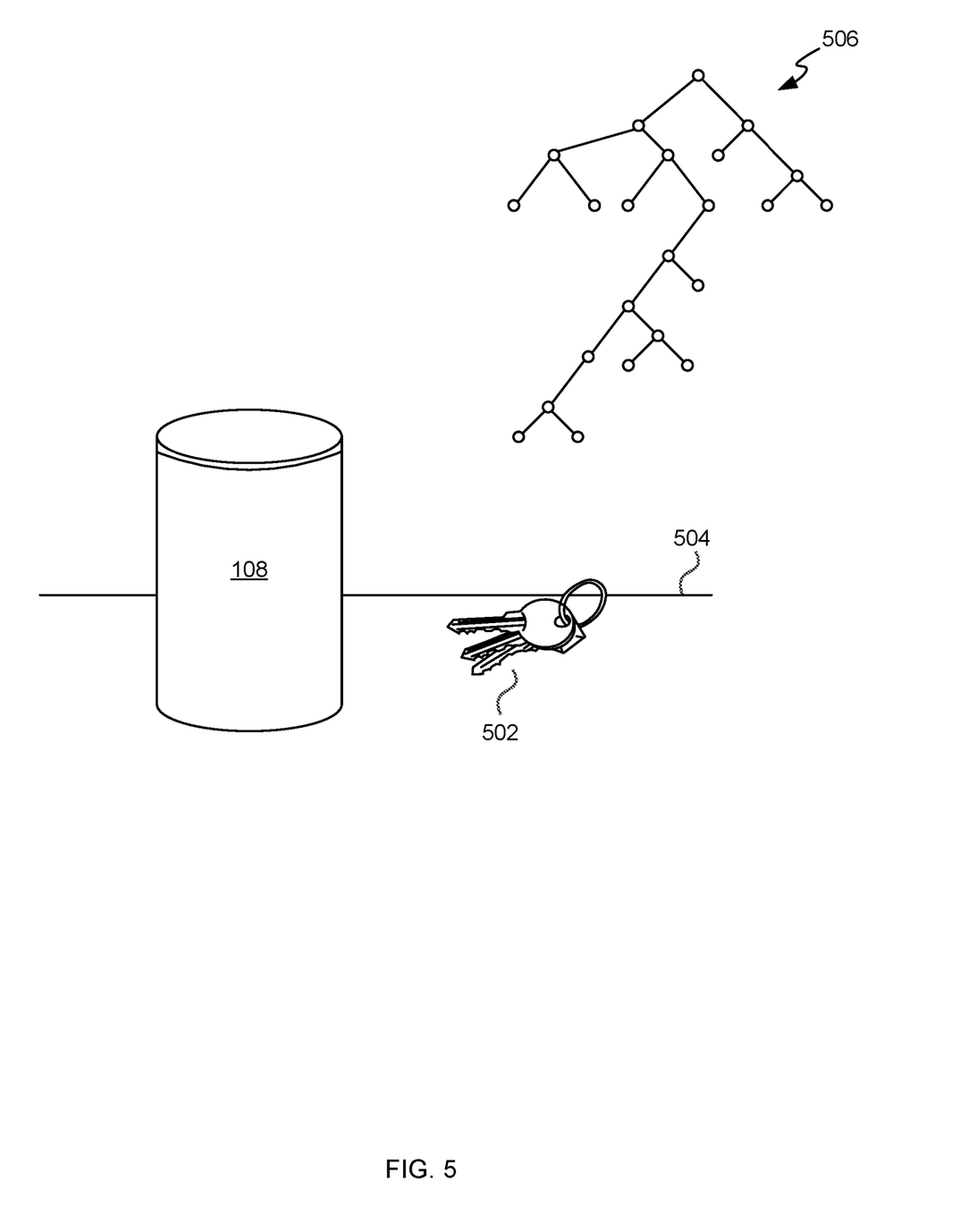
FIG. 5 is a schematic diagram of a chat bot.

In the example of FIG. 5 the agent is a chat bot 108 on a table 504 of an office. On the table 504 is a set of keys 502 to illustrate the relative size of the chat bot 108. The chat bot 108 has a plurality of skills as is well known and has to decide which skill to activate in a particular situation. A non-exhaustive list of example skills is: turn on the lights, turn off the oven, book a restaurant, make a calendar entry.

A decision tree 506 is shown In FIG. 5 and is a schematic representation of a decision tree within software implementing the chat bot 108 in the cloud. Leaves of the decision tree denote skills of the chat bot and internal split nodes of the tree denote decision points. The software of the chat bot searches the decision tree according to the current situation of the chat bot to find a leaf node which denotes which skill to execute in that situation. The chat bot is trained using reinforcement learning with generalization (as described herein) for use by a first family who require the chat bot 108 to perform particular skills in particular situations. The chat bot 108 is then moved to a second family who require the chat bot 108 to perform the skills in different situations. Because the chat bot 108 has been trained with reinforcement learning with generalization it is able to operate well for the second family without needing to be re-trained.

Figure 6:
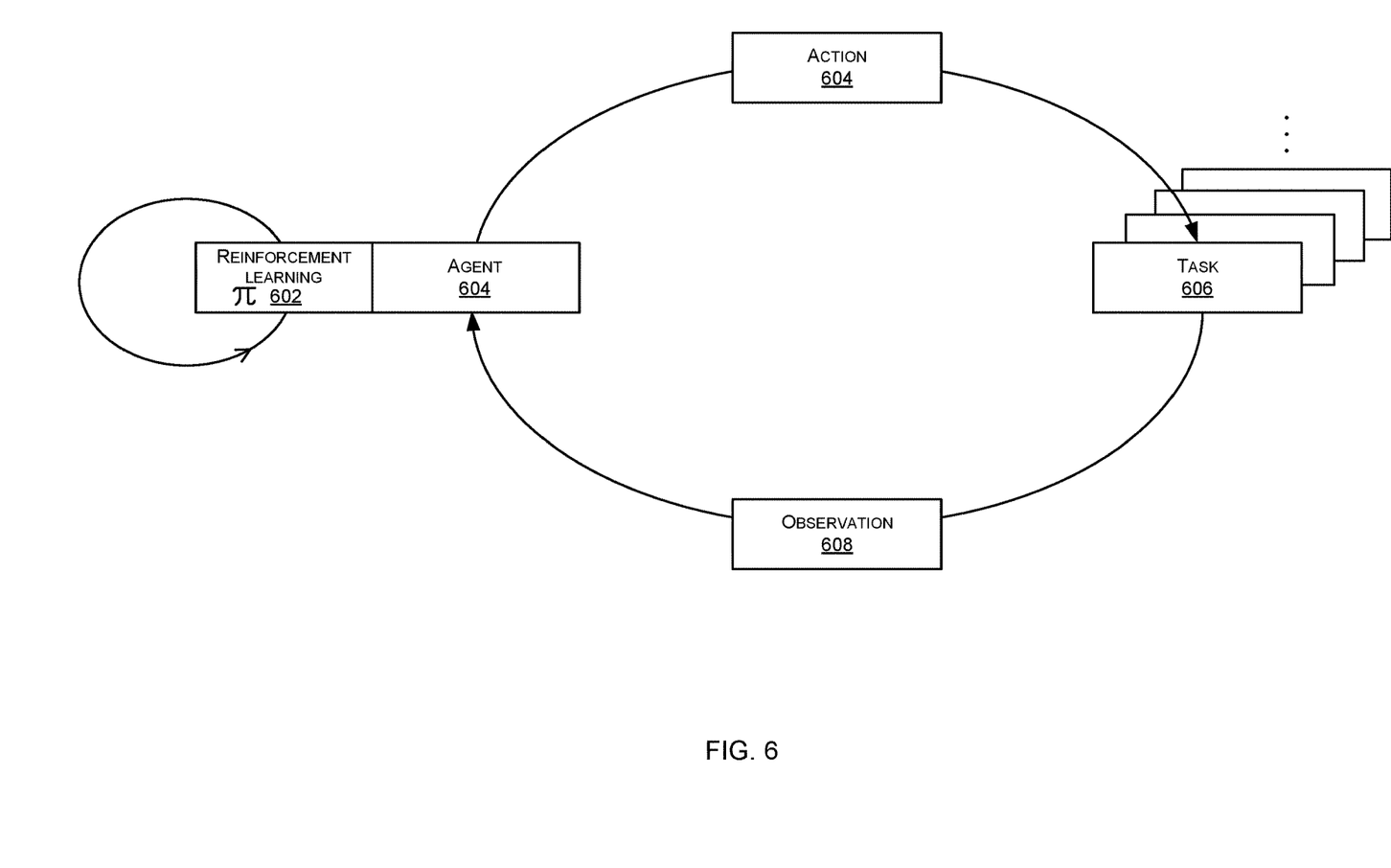
FIG. 6 is a schematic diagram of a reinforcement learning cycle.

FIG. 6 is a schematic diagram of a reinforcement learning cycle. FIG. 6 shows an agent 600 having a reinforcement learning component 602. The agent 600 has a behavior policy denoted using the symbol $\pi$ in FIG. 6 for clarity. The agent is the robot vacuum cleaner 102, or the robot arm 104, or the avatar 106 or the chat bot 108 or any other agent.

When the agent 600 executes with respect to a particular task 606 it carries out an action 604. There are a plurality of possible tasks in an environment of the agent 600 as indicated in FIG. 6. When the agent 600 is first deployed in the environment 506 the behavior policy is initialized to random, or to manually configured settings. What action 604 to execute is computed from the initialized behavior policy by the agent 600 according to its current observation space of the task 606. The action 604 occurs and results in changes that are observed in the observation space. A sequence of actions 604 occurs until the agent achieves the goal of the task or reaches a terminal state where it has failed to achieve the goal of the task. The sequence of actions is referred to as an episode. The agent now has a plurality of sets of values comprising: the information about the action 604, data about the observation space 608, information about a goal of the task and whether it is being met. During the episode data is collected and this is indicated by the loop on the right hand side in FIG. 6.

The agent uses the sets of values as input to the reinforcement learning component 602 in an optimization process indicated by the loop on the left hand side in FIG. 6. The reinforcement learning component 602 updates the behavior policy using an update algorithm according to the sets of observed values from the data collection phase. The behavior policy is updated so as to be more likely to generate actions which will meet a goal of the task in future. The cycle illustrated in FIG. 6 repeats continuously, or at least until there is little change in the behavior policy such as when values of the observed variables are within a specified range of constant.

In order to obtain a trained agent which is able to generalize between tasks, one approach is to use regularization whereby the information storing capacity of the machine learning model implementing the behavior policy is restricted in some way. The inventors have recognized that if regularization is added to a behavior policy, such as the one given below, several instabilities potentially result which are undesirable and lead to poor performance of the trained agent. By using selective regularization these issues are overcome.

An example of a typical training objective of an actor-critic reinforcement learning agent is given below:

$$J(\pi_\theta) = \mathbb{E}_{\pi_\theta(\alpha|s)}[\Sigma_t \gamma^t R_m(s_t, \alpha_t)].$$

The reinforcement learning process seeks a behavior policy $\pi$ having parameters $\theta$ is equal to the maximum discounted expected reward $\mathbb{E}$ for the parameterized behavior policy $\pi_\theta$ given the possible actions a and possible states s, which is computed as the sum for time t over a learning rate for time t times the output of a reward function $R_m$ when given as arguments the state s and action a for time t.

The training objective is optimized (see the left hand side loop of FIG. 6) using well known gradient descent processes whereby the gradient of the training objective is computed and the values of the parameters of the policy are adjusted in a direction according to the computed gradient. The inventors have recognized that in order to compute the gradient of the training objective stated above the following estimate is computed and that a data collection component and an optimization component of the policy are advantageously separated so that regularization can be selectively applied to them.

$$\nabla_\theta J(\pi_\theta) = \mathbb{E}_{\pi_\theta^r(a_t|s_t)} \left[ \sum_t^T \frac{\pi_\theta(a_t \mid s_t)}{\pi_\theta^r(a_t \mid s_T)} \nabla_\theta \log \pi_\theta(a_t \mid s_t)(r_t + \gamma V_\theta(s_t + 1) - V_\theta(s_t)) \right]$$

Which is expressed in words as, an estimate of the gradient of the training objective is equal to the discounted expected reward of a data collection component of the policy, referred to herein as a rollout policy $\pi_\theta^r(\alpha_t|s_t)$, given the sum over time instances t over an episode T of the ratio of the policy being optimized $\pi_\theta$ to the rollout policy $\pi_\theta^r$, times the gradient of the policy times a reward observed at time t plus a discount factor $\gamma$ times a critic $V_\theta$ for the current state plus one, minus the critic $V_\theta$ times a current state. The rollout policy $\pi_\theta^r(\alpha_t|s_t)$ is able to deviate from the policy $\pi_\theta$ but is similar to the policy $\pi_\theta$ to keep the off-policy correction term $\pi_\theta/\pi_\theta^r$ low variance. The rollout policy is referred to herein as a data collection component of the policy.

Through analysis of the above mathematical expression of the estimate of the gradient of the training objective, the inventors have recognized that regularization, when applied to the estimate, potentially leads to several instabilities.

In the rollout policy $\pi_\theta^r$, regularization leads to undesirable actions (potentially ending episodes prematurely) thereby deteriorating the quality of the observed data. Regularization leads to a high variance of the off-policy correction term $\pi_\theta/\pi_\theta^r$ (and thereby gradient) because regularization is potentially different for the optimization component of the policy $\pi_\theta$ and the data collection component of the policy $\pi_\theta^r$. Regularization introduces additional noise into the gradient updates for both the policy and the critic through noise in the critic $V_\theta$.

A short notation for the equation given above for the gradient estimate is given as:

$$\nabla_\theta J(\pi_\theta) = \mathcal{G}_{AC}(\pi_\theta^r, \pi_\theta, V_\theta)$$

Which is expressed in words as, an estimate of the gradient of the training objective is equal to the output of a function $\mathcal{G}_{AC}$ which takes as arguments the rollout policy, the policy and the critic. Note that the critic is not essential. The critic is used in actor critic reinforcement learning processes but the present technology is workable for all types of reinforcement learning process including those which do not use a critic.

The inventors have recognized that by selectively applying regularization it is possible to improve generalization ability of the trained agent whilst carefully controlling potential instabilities resulting from the regularization. In the following mathematical notation a bar above a symbol is used to denote the absence of regularization when computing a component of the gradient estimate, whereas the absence of a bar indicates that regularization is applied when computing a component of the gradient estimate. Thus "selectively applying regularization" means the ability to switch regularization on or off, or to control the amount of regularization applied, when computing an individual component of the gradient estimate.

In an embodiment the gradient estimate is computed using selectively applied regularization as follows:

$$\mathcal{G}_{AC}^{SNI}(\pi_\theta^r, \pi_\theta, V_\theta) = \lambda\, \mathcal{G}_{AC}(\bar{\pi}_\theta^r, \bar{\pi}_\theta, \bar{V}_\theta) + (1-\lambda)\mathcal{G}_{AC}(\bar{\pi}_\theta^r, \pi_\theta, \bar{V}\theta)$$

Which is expressed in words as, an estimate of the gradient of a training objective function taking as arguments a rollout policy $\pi_\theta^r$, a policy $\pi_\theta$ and a critic $V_\theta$, and computed using selectively applied regularization is equal to a weight $\lambda$ times an estimate of the training objective function computed using no regularization plus one minus the weight times an estimate of the training objective function computed using regularization applied to the policy but not to the rollout policy and the critic.

The term "selectively applying" means that different amounts of regularization are applied to the rollout policy and the policy rather than applying regularization to both.

There are various different ways to apply regularization to the reinforcement learning policy and these include combinations of one or more of: selecting an architecture of the machine learning model which restricts the capacity, stochastic regularization whereby noise is added to the machine learning model, an addition to a loss function used when computing an update of the machine learning model.

In an example, regularization is applied by adding noise to the machine learning model so that no noise is applied to the rollout policy and regularization is applied to the optimization policy.

In an example, no regularization is applied to the rollout policy (that is, the data collection component of the policy) and regularization is applied to the optimization component of the policy.

In another example, regularization is applied to both the rollout policy and the optimization component of the policy, but with more regularization applied to the optimization component of the policy than the rollout policy.

In a particular example, the reinforcement learning process is an actor-critic process and regularization is applied as now described and referred to herein as an information bottleneck actor critic method. The information bottleneck actor critic method applies regularization using a combination of architecture design and an addition to a loss function used when computing an update of the machine learning model Early on in training a reinforcement learning agent, there is typically little variation in the training data. Observed states are distributed only around the initial states making spurious correlations in the low amount of data more likely. Furthermore, because neither the policy nor the critic have sufficiently converged yet, there is a high variance in the target values of the loss function.

It is recognized herein that this combination makes it harder and less likely for the network to learn desirable features that are robust under a shifting data-distribution during training and generalize well. To counteract this reduced signal-to-noise ratio, the present disclosure applies an explicit bias to the learning towards finding more compressed features which are shown to have a tighter worst-case generalization bound.

To incentivize more compressed features, the policy gradient update is expressed as maximization of the log-marginal likelihood of $\pi_\theta(\alpha|s)$ under a (assumed non-changing) data distribution $$p(s, a) := \frac{\rho^\pi(s)\pi_\theta(a \mid s) A^\pi(s, a)}{z}$$

with discounted state distribution $\rho^\pi(s)$ advantage function $A^\pi(s, \alpha)$ and normalization constant Z. Taking the gradient of this objective recovers the policy gradient:

$$\nabla_\theta \mathbb{E}_{p(s,\alpha)}[\log \pi_\theta(\alpha|s)] = z \int p^\pi(s)\pi_\theta(\alpha|s)\nabla_\theta \log \pi_\theta(\alpha|s) A^\pi(s,\alpha) ds\, d\alpha$$

By introducing a stochastic latent variable z and minimize $\beta I(S, Z)$ while maximizing $I(Z, A)$ under $p(s, \alpha)$, resulting in the new objective:

$$L_{IB} = \mathbb{E}_{p(s,\alpha), p_\theta(z|s)}[-\log q_\theta(\alpha|z) + \beta D_{KL}[p_\theta(z|s)\|r(z)]]$$

Taking the gradient and using reparameterization to write the encoder $p\theta(z|s)$ as deterministic function $f_\theta(s, \in)$ with $\in \sim p(\in)$ gives:

$$\nabla_\theta L_{IB} = -\mathbb{E}_{p^\pi(s)\pi_\theta(\alpha|s)p(\in)}[\nabla_\theta \log q_\theta(\alpha|f_\theta(s,\in))A^\pi(s,\alpha)] + \nabla_\theta \beta D_{KL}[p_\theta(z|s)\|r(z)] = \nabla_\theta(L_{AC}^{IB} + \beta L^{KL})$$

resulting in a modified policy gradient objective and an additional regularization term $L^{KL}$. Note that $\pi_\theta(\alpha|s) = \mathbb{E}_z[q_\theta(\alpha|z)]$ is the marginal policy.

Policy gradient algorithms heuristically add an entropy bonus $H[\pi_\theta(\alpha|s)]$ to prevent the policy distribution from collapsing. However, this term also influences the distributions over z. In practice, only preventing $q_\theta(\alpha|z)$ (not $\pi_\theta(\alpha|s) = \mathbb{E}_z[q_\theta(\alpha|z)]$) from collapsing is possible because the rollout policy $\bar\pi_\theta$ will not rely on stochasticity in z. Additionally, $p_\theta(z|s)$ is already entropy-regularized by the IB loss term. Consequently, it is possible to adapt the heuristic entropy bonus to $$H^{IB}[\pi_\theta(\alpha|s)] := \int p_\theta(s,z) H[q_\theta(\alpha|z)] ds\, dz$$

Resulting in the overall loss function of the proposed Information Bottleneck Actor Critic (IBAC):

$$L_t^{IBAC}(\theta) = L_{AC}^{IB} + \lambda_V L_{AC}^V - \lambda_H H^{IB}[\pi_\theta] + \beta L^{KL}$$

Which is expressed in words as the loss function of the information bottleneck actor critic is equal to the policy loss $L_{AC}^{IB}$ plus a first weight $\lambda_V$ times the loss $L_{AC}^V$ of the critic minus a second weight $\lambda_H$ times the heuristic entropy bonus of the policy plus a Lagrangian multiplier hyperparameter $\beta$ times a regularization term. The policy loss is computed as $$L_{AC}^{IB} = -\mathbb{E}_{p^\pi(s)\pi_\theta(\alpha|s)p(\in)}[\nabla_\theta \log q_\theta(\alpha|f_\theta(s,\in))A^\pi(s,\alpha)]$$

While IBAC incentivizes more compressed features, it also introduces stochasticity. Thus to further improve performance, regularization is NOT applied to the rollout policy component. To compute the noise-suspended policy $\bar\pi_\theta$ and critic $V_\theta$, use the mode $z = \mu_\theta(s)$ as input to $q_\theta(\alpha|z)$ and $V_\theta(z)$ where $\mu_\theta(s)$ is the mode of $p_\theta(z|s)$.

Figure 7:
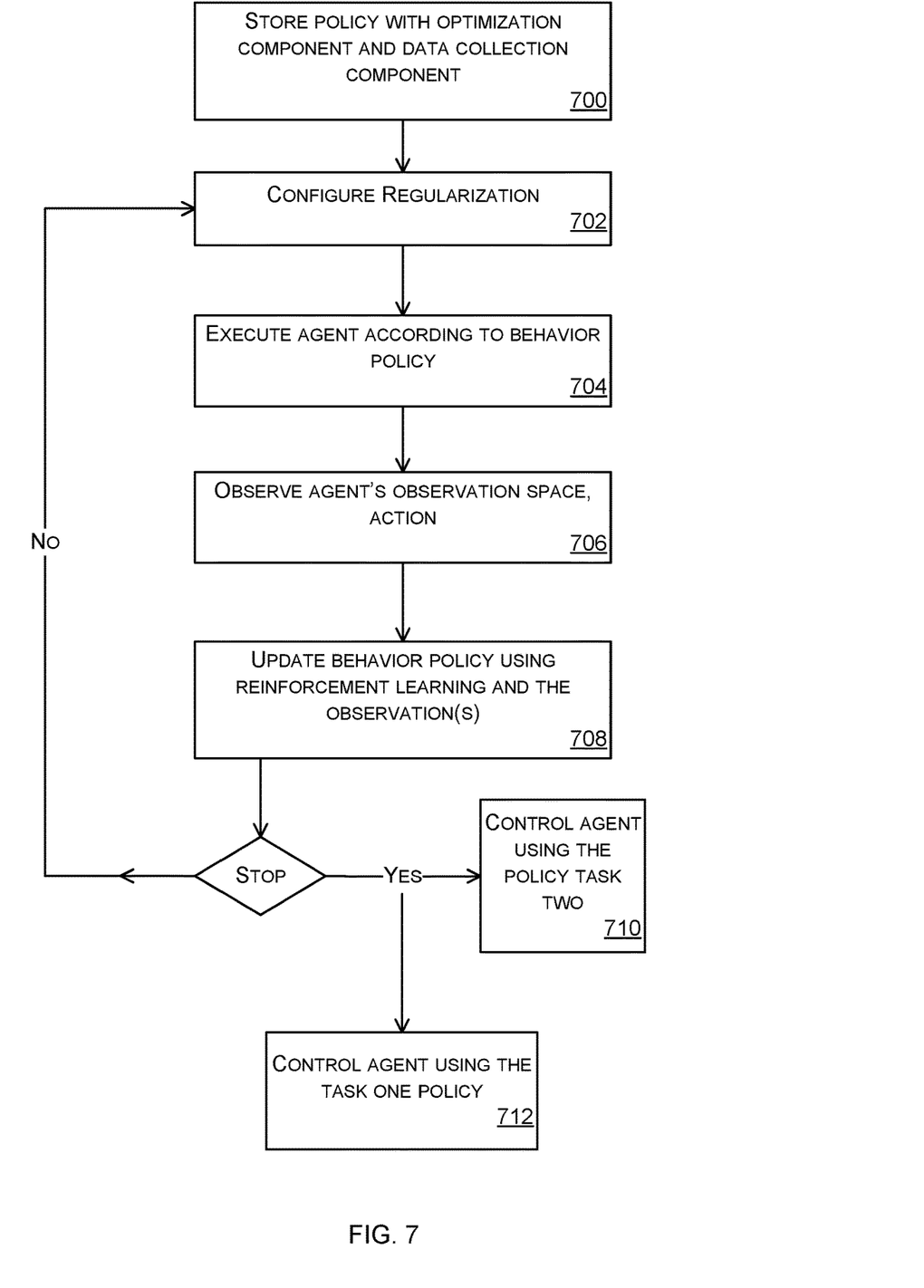
FIG. 7 is a flow diagram of a method performed in the cloud or by an agent for training a behavior of an agent.

FIG. 7 is a flow diagram of a method of training a reinforcement learning agent. A behavior policy is stored 700 with an optimization component and a data collection component. Regularization is configured 702 whereby it is computed how much regularization to selectively apply to the optimization component and the data collection component. The computation is done using rules, thresholds, criteria, historical data about performance of the agent, historical data about training reinforcement learning agents or user input. The agent executes 704 according to its behavior policy with the selective regularization applied and the agent observes 706 its observation space for a first task, the action it took, and any outcome. The agent updates 708 the behavior policy using reinforcement learning and the observations and with the regularization selectively applied. A decision is taken whether to stop learning, and if so the agent is triggered to control itself using the behavior policy with respect to the first task. Because the agent has been trained using regularization it is able to use the policy to control itself with regard to task two, which is different from the first task.

If the agent decides to continue training the process of FIG. 7 repeats from operation 702.

Figure 8:
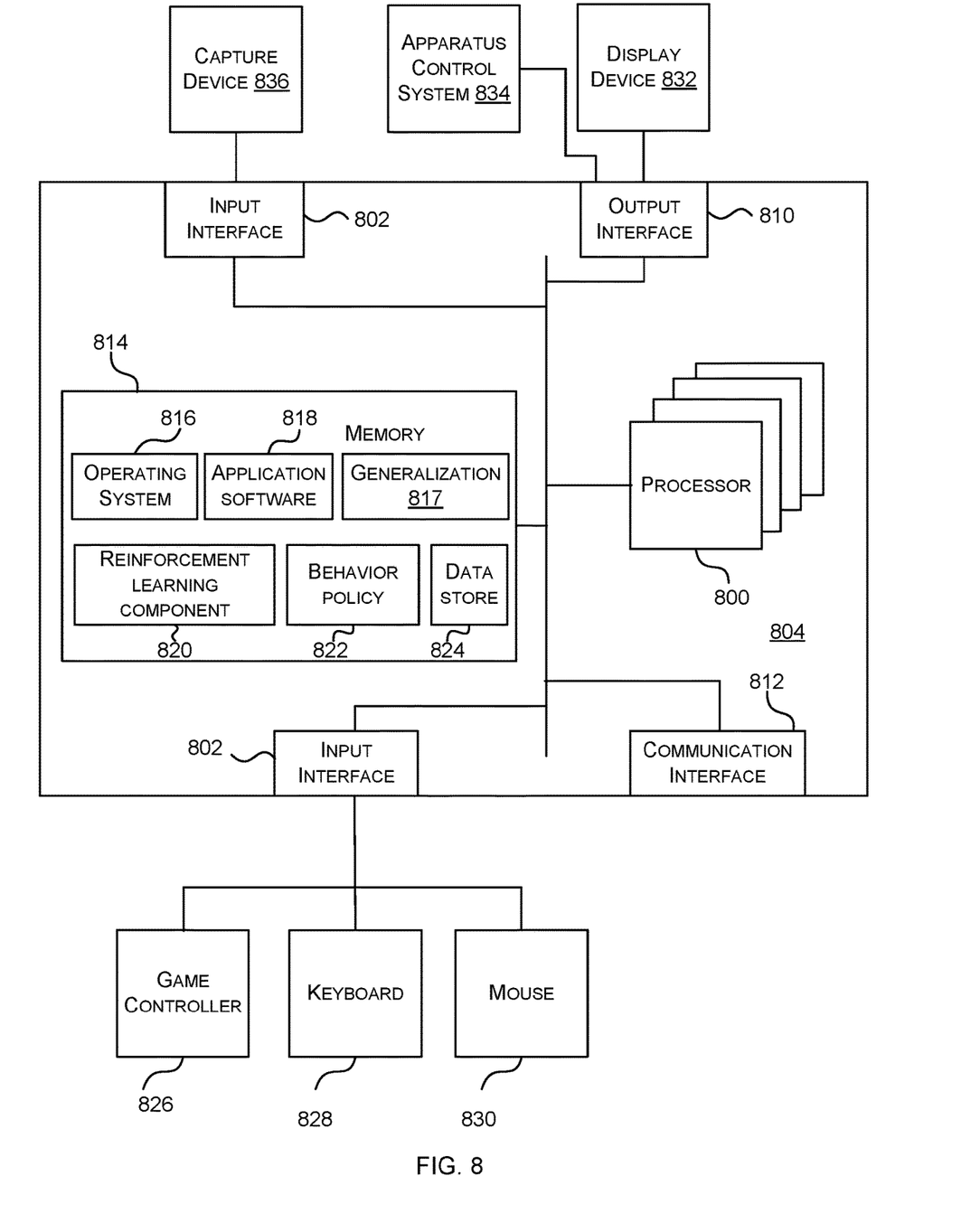
FIG. 8 illustrates an exemplary computing-based device in which embodiments of an agent are implemented.

FIG. 8 illustrates various components of an exemplary computing-based device 804 which are implemented as any form of a computing and/or electronic device, and in which embodiments of an agent are implemented in some examples.

Computing-based device 804 comprises one or more processors 800 which are microprocessors, controllers or any other suitable type of processors for processing computer executable instructions to control the operation of the device in order to execute the agent on a task according to a behavior policy 822 and using selective regularization. In some examples, for example where a system on a chip architecture is used, the processors 800 include one or more fixed function blocks (also referred to as accelerators) which implement a part of the method of executing the agent and/or training the agent in hardware (rather than software or firmware). Platform software comprising an operating system 816 or any other suitable platform software is provided at the computing-based device to enable application software 818 to be executed on the device. A generalization component 817 has functionality for selectively applying regularization to a behavior policy 822 of a reinforcement learning component 820. A data store 824 holds values of observation space variables, action variables and thresholds, criteria or user input specifying what selective regularization to use.

The computer executable instructions are provided using any computer-readable media that is accessible by computing based device 804. Computer-readable media includes, for example, computer storage media such as memory 814 and communications media. Computer storage media, such as memory 814, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 814) is shown within the computing-based device 804 it will be appreciated that the storage is, in some examples, distributed or located remotely and accessed via a network or other communication link (e.g. using communication interface 812).

The computing-based device 804 also comprises an output interface 810 arranged to output display information to a display device 832 which may be separate from or integral to the computing-based device 804. The output interface 810 also sends instructions to an apparatus control system 834 such as a robot arm where the agent 804 is a robot arm, or a motor where the agent is a robot vacuum cleaner. The display information may provide a graphical user interface. An input interface 802 is arranged to receive and process input from one or more devices, such as a user input device (e.g. a mouse 830, keyboard 828, game controller 826, capture device 836, camera, microphone or other sensor). In some examples the user input device detects voice input, user gestures or other user actions and provides a natural user interface (NUI). This user input may be used to position reward tokens in the environment. In an embodiment the display device 832 also acts as the user input device if it is a touch sensitive display device.

Figure 9:
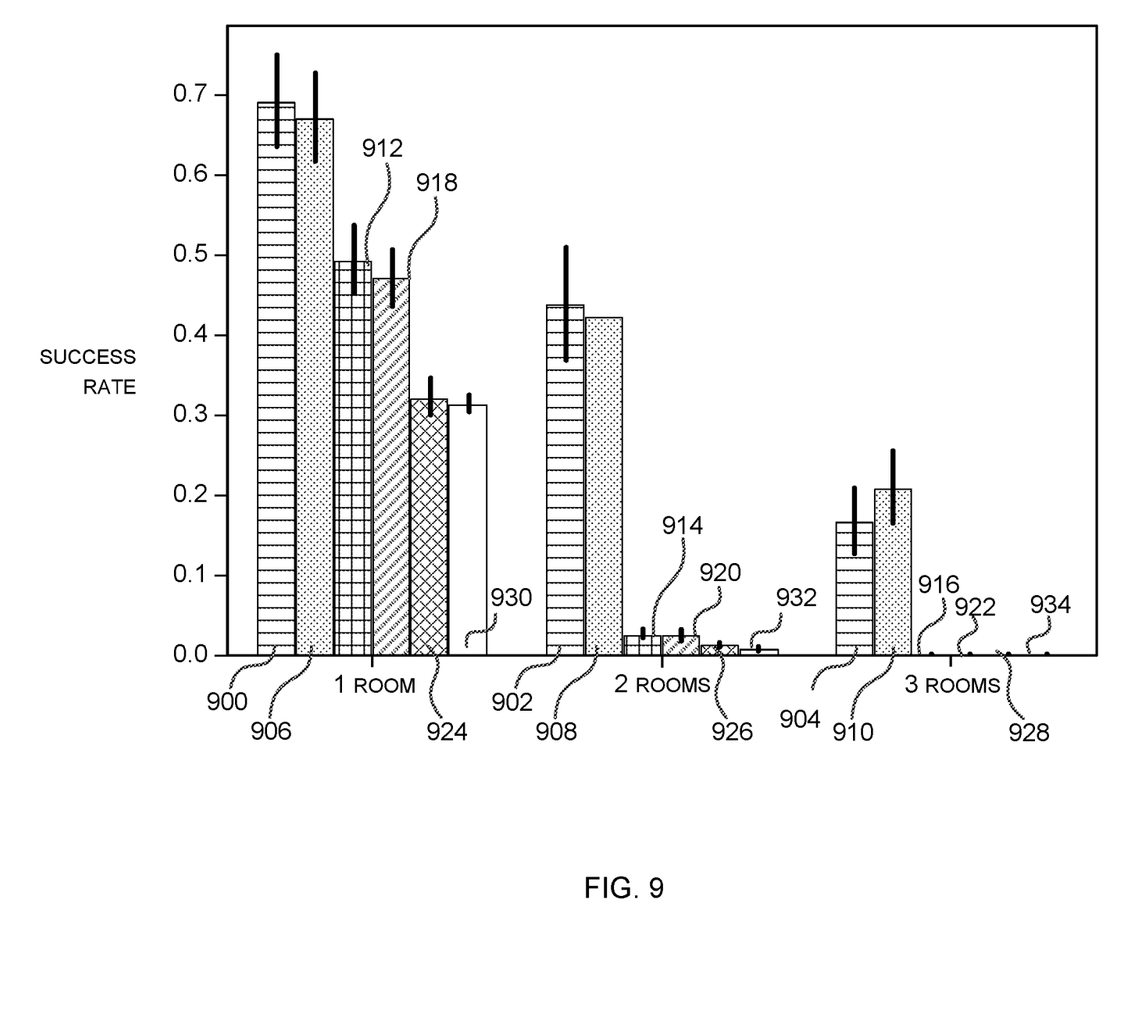
FIG. 9 is a graph of success rate against number of rooms for a reinforcement learning agent trained using a variety of different methods.

FIG. 9 is a bar chart of empirical data showing improved generalization ability of reinforcement learning agents trained using the selective regularization. The y axis of the bar chart represents the success rate of a reinforcement learning agent at traversing a sequence of rooms (each room represented as a grid of squares) to reach a goal as quickly as possible. It takes discrete actions to rotate 90° in either direction, move forward and toggle doors to be open or closed. The observation received by the agent includes the full grid, one pixel per square, with object type and object status (like direction) encoded in 3 color channels. For each episode, the layout is generated randomly by placing a random number of rooms (one, two or three rooms) in a sequence connected by one door each.

The results in FIG. 9 show the success rate against the number of rooms in the sequence. If the reinforcement learning agent has good generalization ability it is expected to be able to complete all the rooms despite not having been trained on them all. The data in bars 900, 902, 904 shows the success rate for an agent trained using the information bottleneck actor critic policy mentioned above. This agent performs well and is able to generalize to all three rooms. The data in bars 906, 908, 910 shows the success rate for an agent trained using the information bottleneck actor critic policy combined with selective regularization. In this case the agent has the best performance for three rooms i.e. generalization ability is extremely high.

The data in bars 912, 914, 916 shows the success rate for an agent trained using dropout which is a well known regularization method used here for comparison purposes. In dropout individual activations are randomly zeroed out with a fixed probability. This serves to prevent co-adaptation of neurons and is applied to any layer inside the network such as the last hidden layer. It is seen that the agent trained learning dropout cannot generalize to three rooms. The same applies for an agent trained using dropout combined with selective regularization (see bars 918, 920, 922) and for an agent trained using no regularization (see bars 924, 926, 928).

Where the weight decay is used, also called L2 regularization, the magnitude of the weights of a neural network for computing the policy are reduced by adding an additional loss term to decay the weights. The agent is not able to generalize to three rooms (see bars 930, 932, 934).

Figure 10:
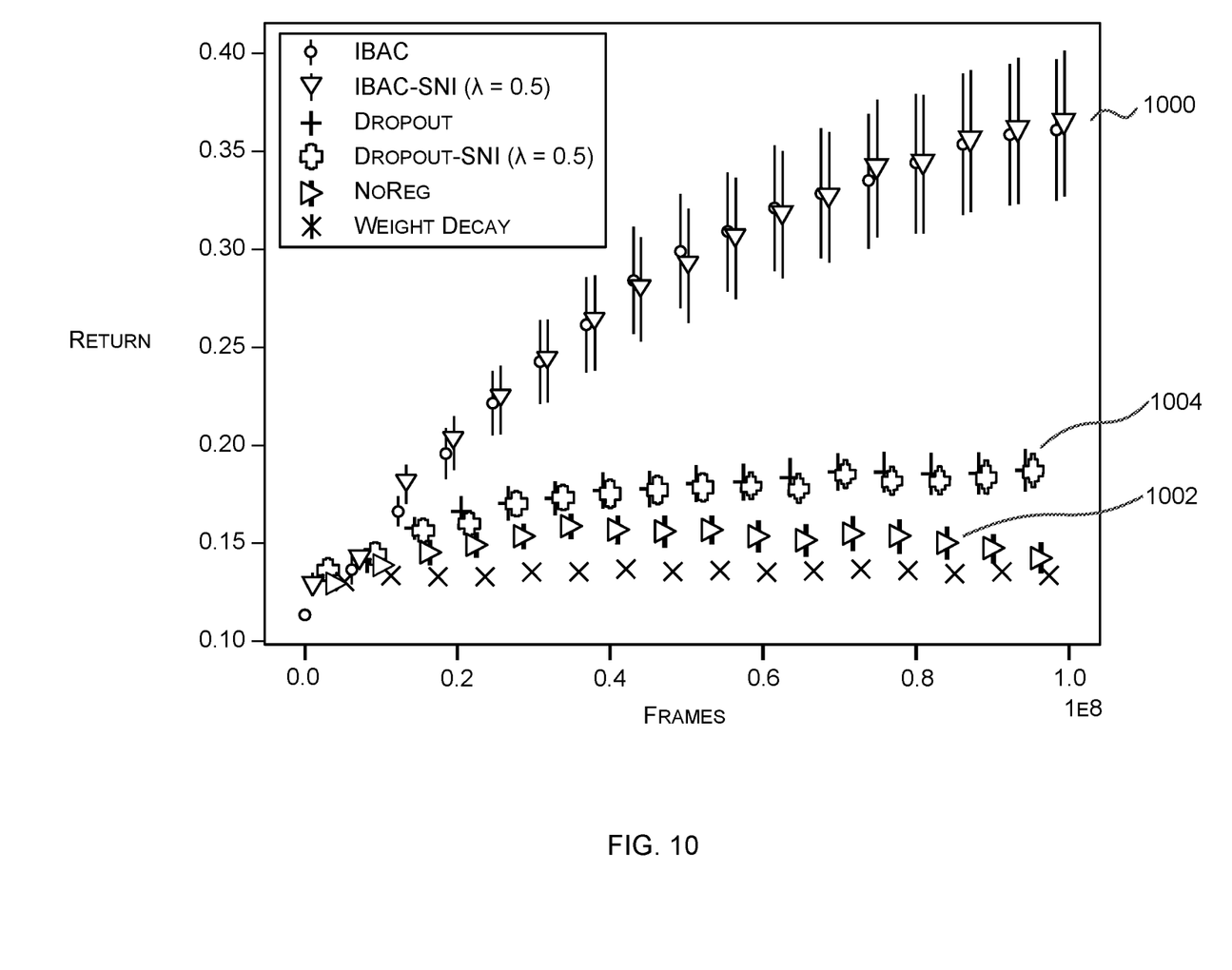
FIG. 10 is a graph of return against frames for a reinforcement learning agent trained in the same scenario as for FIG. 10.

FIG. 10 is a plot of return against frames for the same scenario as FIG. 9. It is seen that the learning rate is significantly higher when selective regularization is used as compared with no regularization. The data in curve 1004 is from the agent trained with dropout and selective regularization. The data in curve 1002 is for the case with no regularization. The data in curve 1000 is for the case where the agent is trained using IBAC.

The data in FIGS. 9 and 10 show that only IBAC agents are able to successfully learn to solve the task about half the time. The shown results are averaged across 30 random seeds, with successful agents achieving returns close to 1. The difficulty of this seemingly simple task arises from its generalization requirements as most states are never observed twice. Dropout regularized agents never learn to solve the task for three rooms but sometimes learn to solve simpler configurations with one room. It is also shown that using selective regularization results in faster training.

Figure 11:
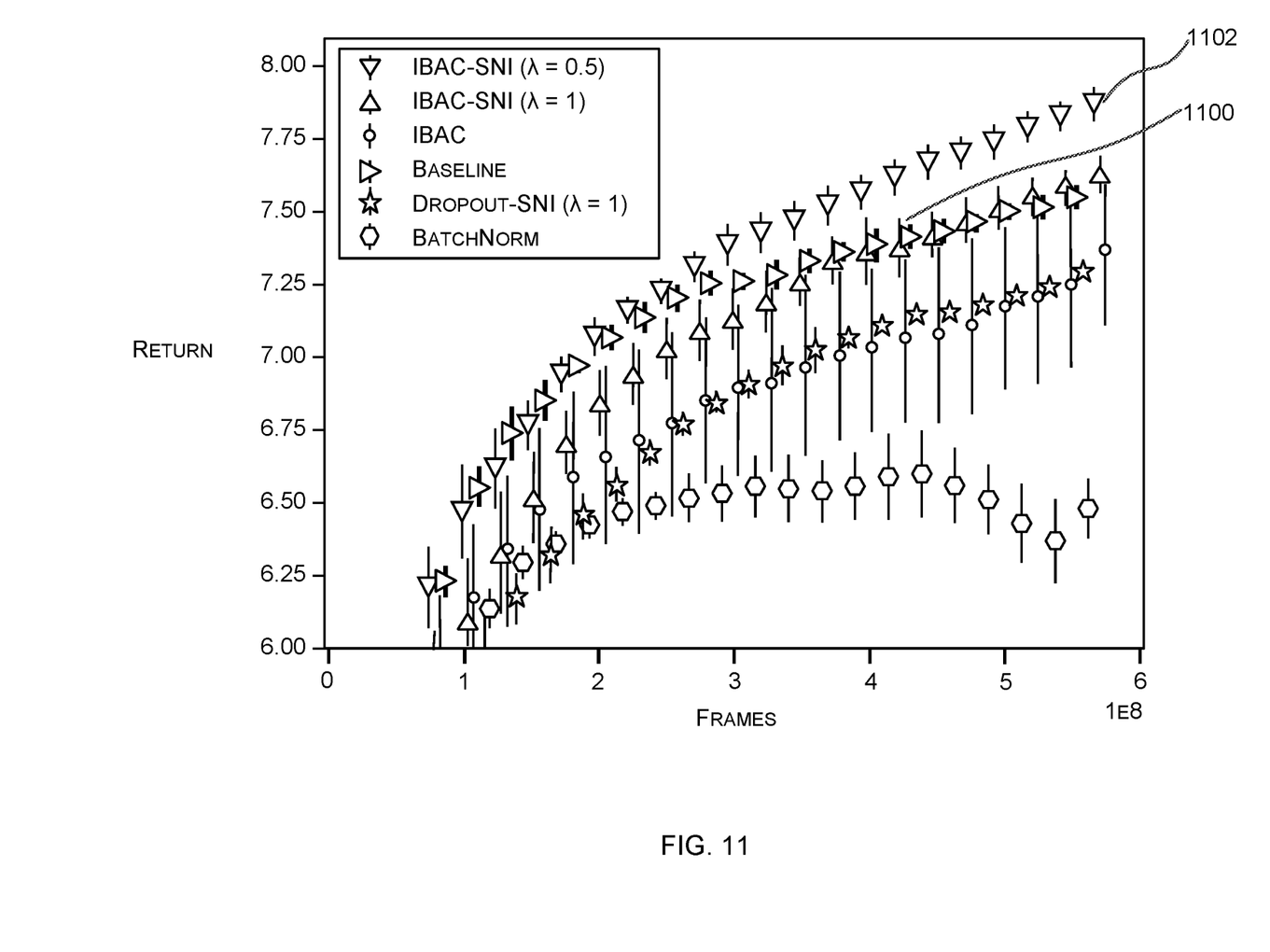
FIG. 11 is a graph of return against frames for a reinforcement learning agent trained on the well-known Coinrun task using a variety of different methods.

The data in FIG. 11 is for the case where the agent is trained on Coinrun which is a well known generalization benchmark. Approaches such as batch normalization, where there is no selective regularization, performed worse than the baseline (for the baseline see curve 1100). However, where IBAC is used with selective regularization performance is generally better than the baseline (see curve 1102).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An apparatus comprising:
   a memory storing a behavior policy having an optimization component and a data collection component; and
   a processor carrying out a reinforcement learning process by:
   performing a first task according to the behavior policy;
   upon performing the first task, updating the behavior policy using reinforcement learning, wherein updating the behavior policy comprises computing a loss function by utilizing a policy loss;
   applying regularization to the optimization component and the data collection component of the updated behavior policy, wherein applying the regularization comprises adding to the loss function a loss term that decays a weight of the loss function; and
   upon applying the regularization, performing a second task according to the updated behavior policy, wherein the second task is different from the first task.

2. The apparatus of claim 1, wherein the processor further carries out the reinforcement learning process by using reinforcement learning with generalization.

3. The apparatus of claim 1, wherein the processor further carries out the reinforcement learning process by computing different amounts of regularization using at least one of rules, thresholds, criteria, historical data about performance of an agent, or historical data about training of the agent.

4. The apparatus of claim 1, wherein applying regularization comprises applying different amounts of regularization to the optimization component and the data collection component of the updated behavior policy.

5. The apparatus of claim 1, wherein updating the behavior policy comprises updating the behavior policy according to a tuple of values associated with the first task, wherein the tuple of values includes a value of an observation space variable for a current time and a value of an action variable for actions at the current time.

6. The apparatus of claim 5, wherein the tuple of values further includes a value of a reward.

7. The apparatus of claim 1 wherein the first task comprises operation of a physical entity in a first physical environment, and the second task comprises operation of the physical entity in a second physical environment different from the first physical environment.

8. The apparatus of claim 1, wherein applying the regularization comprises using an addition to the loss function.

9. The apparatus of claim 1, wherein updating the behavior policy comprises updating the behavior policy using a value of an observation space variable for a current time and using a value of an action variable for actions at the current time.

10. The apparatus of claim 1, further comprising observing values of variables comprising an observation space of an agent and an action of the agent, wherein updating the behavior policy comprises updating the behavior policy using the observed values.

11. A computer-implemented method comprising:
   storing, at a memory, a behavior policy having an optimization component and a data collection component; and
   carrying out a reinforcement learning process by:
      performing a first task according to the behavior policy;
      upon performing the first task, updating the behavior policy using reinforcement learning, wherein updating the behavior policy comprises computing a loss function by utilizing a policy loss;
      applying regularization to the optimization component and the data collection component of the updated behavior policy, wherein applying the regularization comprises adding to the loss function a loss term that decays a weight of the loss function; and
      upon applying the regularization, performing a second task according to the updated behavior policy, wherein the second task is different from the first task.

12. The computer-implemented method of claim 11, wherein applying regularization comprises applying different amounts of regularization to the optimization component and the data collection component of the updated behavior policy.

13. The computer-implemented method of claim 11, wherein updating the behavior policy comprises updating the behavior policy according to a tuple of values associated with the first task, wherein the tuple of values includes a value of an observation space variable for a current time and a value of an action variable for actions at the current time.

14. The computer-implemented method of claim 13, wherein the tuple of values further includes a value of a reward.

15. The computer-implemented method of claim 11 wherein the first task comprises operation of a physical entity in a first physical environment, and the second task comprises operation of the physical entity in a second physical environment different from the first physical environment.

16. A computer storage device with device-executable instructions that, when executed by a computing system, direct the computing system to perform operations comprising:
   storing a behavior policy having an optimization component and a data collection component; and
   carrying out a reinforcement learning process by:
      performing a first task according to the behavior policy;
      upon performing the first task, updating the behavior policy using reinforcement learning, wherein updating the behavior policy comprises computing a loss function by utilizing a policy loss;
      applying regularization to the optimization component and the data collection component of the updated behavior policy, wherein applying the regularization comprises adding to the loss function a loss term that decays a weight of the loss function; and
      upon applying the regularization, performing a second task according to the updated behavior policy, wherein the second task is different from the first task.

17. The computer storage device of claim 16, wherein carrying out the reinforcement learning process comprises using reinforcement learning with generalization.

18. The computer storage device of claim 16, wherein carrying out the reinforcement learning process comprises computing different amounts of regularization using at least one of rules, thresholds, criteria, historical data about performance of an agent, or historical data about training the agent.

19. The computer storage device of claim 16, wherein applying regularization comprises applying different amounts of regularization to the optimization component and the data collection component of the updated behavior policy.

20. The computer storage device of claim 16, wherein updating the behavior policy comprises updating the behavior policy according to a tuple of values associated with the first task, wherein the tuple of values includes a value of an observation space variable for a current time and a value of an action variable for actions at the current time.

* * * * *